(12) United States Patent
Park (10) Patent No.: US 9,223,387 B2
(45) Date of Patent: Dec. 29, 2015

(54) RESCHEDULING ACTIVE DISPLAY TASKS TO MINIMIZE OVERLAPPING WITH ACTIVE PLATFORM TASKS

(75) Inventor: Hee-jun Park, Portland, OR (US)

(73) Assignee: Intel Corporation, Santa Clara, CA (US)

(*) Notice: Subject to any disclaimer, the term of this patent is extended or adjusted under 35 U.S.C. 154(b) by 413 days.

(21) Appl. No.: 13/151,401

(22) Filed: Jun. 2, 2011

(65) Prior Publication Data

US 2012/0311590 A1 Dec. 6, 2012

(51) Int. Cl.
*G06F 9/46* (2006.01)
*G06F 1/32* (2006.01)
*G09G 3/34* (2006.01)

(52) U.S. Cl.
CPC .............. *G06F 1/3265* (2013.01); *G06F 1/329* (2013.01); *G09G 3/3406* (2013.01); *G09G 2320/064* (2013.01); *G09G 2330/021* (2013.01); *Y02B 60/1242* (2013.01); *Y02B 60/144* (2013.01)

(58) Field of Classification Search
None
See application file for complete search history.

(56) References Cited

U.S. PATENT DOCUMENTS

| | | | | |
|---|---|---|---|---|
| 5,613,133 | A * | 3/1997 | Bell et al. | 717/162 |
| 7,246,220 | B1 * | 7/2007 | Cheng et al. | 712/228 |
| 2004/0205757 | A1 | 10/2004 | Pering | |
| 2005/0259064 | A1 * | 11/2005 | Sugino et al. | 345/102 |
| 2006/0064689 | A1 * | 3/2006 | Zhang | 718/100 |
| 2007/0091058 | A1 * | 4/2007 | Nam et al. | 345/102 |
| 2007/0229447 | A1 * | 10/2007 | Takahara et al. | 345/102 |
| 2009/0074058 | A1 * | 3/2009 | Zhang et al. | 375/240.03 |
| 2009/0307519 | A1 | 12/2009 | Hyatt | |
| 2010/0185882 | A1 | 7/2010 | Arnold et al. | |

FOREIGN PATENT DOCUMENTS

| WO | 2012/166752 A3 | 5/2012 |
|---|---|---|
| WO | 2012/166752 A2 | 12/2012 |

OTHER PUBLICATIONS

International Search Report and Written Opinion received for PCT Patent Application No. PCT/US2012/039905, mailed on Nov. 28, 2012, 10 pages.
International Preliminary Report on Patentability and Written Opinion received for PCT Patent Application No. PCT/US2012/039905, mailed on Dec. 12, 2013, 7 pages.

* cited by examiner

*Primary Examiner* — Sisley Kim
(74) *Attorney, Agent, or Firm* — Douglas J. Ryder; Ryder, Lu, Mazzeo & Konieczny LLC (57) ABSTRACT

In general, in one aspect, a mobile device display includes panel electronics, a backlight driver and a rescheduler. The panel electronics is to generate images on an optical stack of the display based on input from a processing platform of the mobile device. The backlight driver is to control operation of a backlight used to illuminate the optical stack so that the user can see the images generated on the display. The rescheduler is to determine when a timing critical task of the processing platform overlaps with a non-timing critical task of the panel electronics or the backlight driver and reschedule the non-timing critical task until the timing critical task is inactive or a visual tolerance limit has been reached. The rescheduling minimizes overlap between the timing critical tasks and non-timing critical tasks and accordingly reduces power consumption without effecting performance or impacting a user's visual experience.

21 Claims, 5 Drawing Sheets

RESCHEDULING ACTIVE DISPLAY TASKS TO MINIMIZE OVERLAPPING WITH ACTIVE PLATFORM TASKS

BACKGROUND

Mobile devices are continuing to increase in popularity and the processing capability continues to increase. Accordingly, more and more tasks are performed on mobile devices. In order to ensure the continued proliferation of mobile devices extending the life of the batteries used to power the mobile devices is a necessity. High current peaks (wide current fluctuations) for the mobile device significantly increases the power loss of the mobile device.

The significant power loss (P) is due to a squared relationship with current (I), where the power loss equals the product of the current squared and the resistance (R), such that $P=I^2R$. Both the internal resistance (cell impedance) of the battery and the resistance of the power delivery path from the battery to the mother board (e.g., circuits, connectors, circuit board) effect the power loss of the device. By way of example, Lithium (Li)-ion battery cells may have a cell impedance of approximately 70-350 mili-ohms (mΩ) and older batteries with many charge/discharge cycles have even higher cell impedance. The power delivery path may have a resistance of about 30 mΩ. The power loss reduces the actual amount of usable energy from the battery for the mobile device (actual energy from the battery is less than the specified battery capacity).

Figure 1:
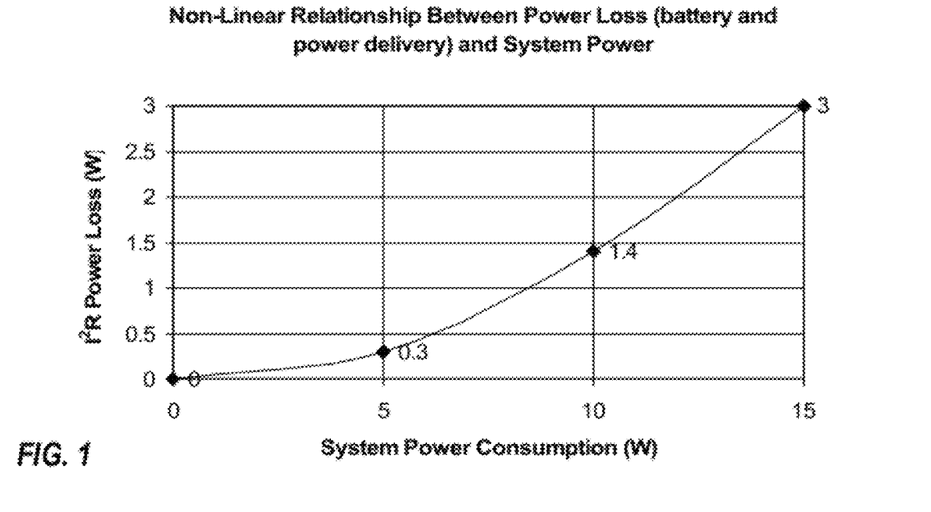
FIG. 1 illustrates an example graph of the relationship between system power consumption and battery power loss.

FIG. 1 illustrates an example graph of the relationship between system power consumption and power loss. The power loss is associated with a battery powering the system and the power delivery path. The relationship is not linear due to the squared relationship between power loss and current. As illustrated, when the system power increases three fold from 5 watts (W) to 15 W the power loss increases ten fold from 0.3 W to 3 W.

High current peaks may also temporarily cause deeper battery voltage drops, and if the temporary voltage drops go below a defined cut-off voltage, the system may shut-down prematurely. Furthermore, the trend for some processors is to enter an idle state quicker to reduce power consumption. This trend may decrease platform power but may increase the peak currents further which will result in an increased power loss and reduction in the actual amount of usable energy from the battery.

BRIEF DESCRIPTION OF THE DRAWINGS

The features and advantages of the various embodiments will become apparent from the following detailed description in which.

DETAILED DESCRIPTION

Figure 2:
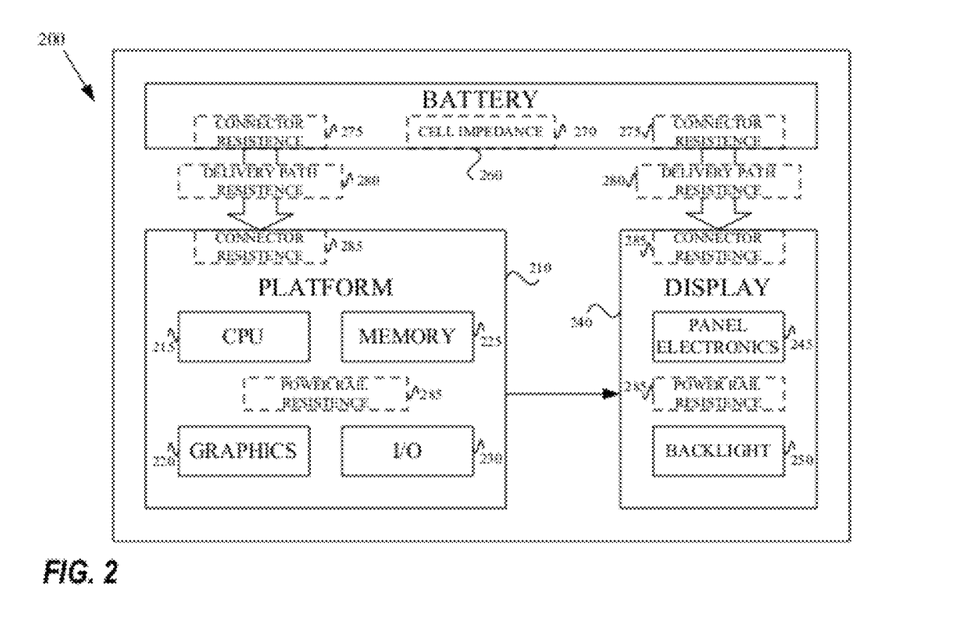
FIG. 2 illustrates a high level block diagram of an example mobile device.

FIG. 2 illustrates a high level block diagram of an example mobile device 200. The mobile device 200 may include a processing platform 210, a display 240 and a battery 260. The processing platform 210 may include a main processor (CPU) 215, a graphics processor 220, memory 225 and input/output (I/O) 230. The display 240 may include panel electronics 245 and a backlight 250. The battery 260 provides power to both the processing platform 210 and the display 240. The power loss in the device 200 may be based on the cell impedance 270 in the battery 260, the resistance in the connectors 275 (battery 260, platform 210, and display 240), the resistance in the power delivery means 280, and the resistance in the power rails on the printed circuit boards 285 (platform 210, display 240).

The platform 210 and the display 240 may be active at the same time during video playback on the mobile device 200. The platform 210 (CPU 215, graphics 220, memory 225 and/or I/O 230) may receive and process data related to a video in order to present the video to the display 240. The panel electronics 245 may generate images on the optical stack (not illustrated) of the display 240 based on input from the platform 210. A backlight driver (not illustrated) may control operation of the backlight 250 to illuminate the optical stack so that the user can see the images generated on the display 240.

During video playback, the platform 210 (CPU 215, graphics 220, memory 225 and/or I/O 230) may be active approximately 50 to 100 times per second, the panel electronics 245 may be active to refresh the image presented on the display 240 approximately 50 to 60 times/sec, and the backlight 250 may be active to illuminate the image presented on the display approximately 200 times/sec. When both the platform 210 and the display 240 are active at the same time they are both drawing current and the increased current increases the power loss. The increased power loss may result in the battery needing to be recharged more often, the increased recharging may increase the cell impedance of the battery 260, and the increased cell impedance may reduce the life of the battery 260.

The activities performed by the device 200 can be divided into timing critical activities and visual experience (non-timing) critical activities. Timing critical activities are those that can not be delayed without impacting the operation of the device 200. Visual experience critical activities are those that may be delayed up to several milliseconds (msec) without impacting a user's visual experience as human eyes are not sensitive enough to detect such a delay. The timing critical activities are those performed by the platform 210 (CPU 215, graphics 220, memory 225 and/or I/O 230) while the visual experience critical activities are those performed by the display 240 (panel electronics 245, backlight 250). Accordingly, there may be an opportunity to reschedule some of the visual experience critical activities (display activities) to reduce the device's power peak.

Figure 3:
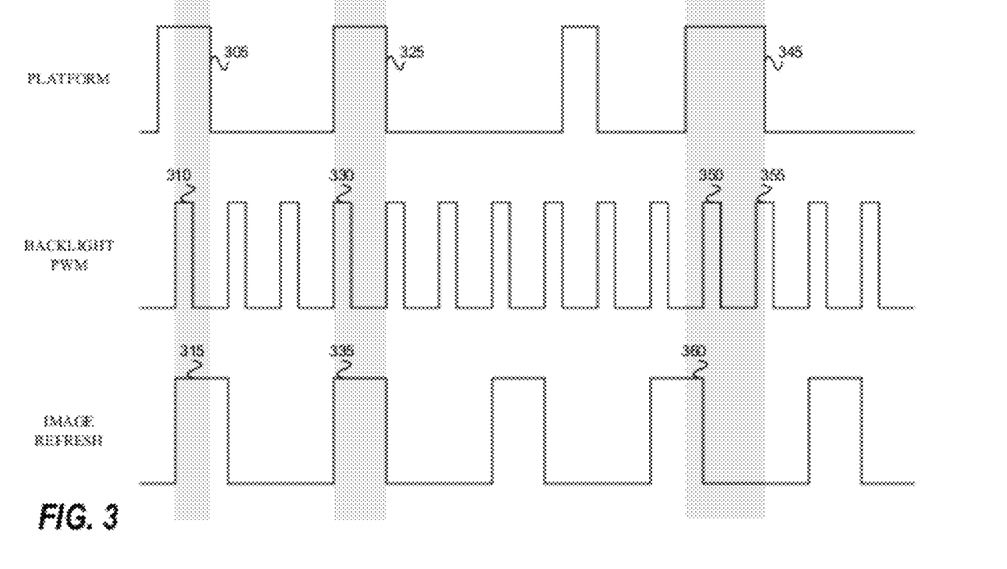
FIG. 3 illustrates an example timing diagram showing overlapping active periods between the platform and the display.

FIG. 3 illustrates an example timing diagram showing overlapping active periods between the platform and the display (backlight, image refresh). The platform is active when processing is required and the duration of the active periods and the time between active periods may vary. The backlight may alternate between on and off at a fast rate, pulse width modulation (PWM). The flickering on/off of the backlight can not be detected by the human eye. Rather, the amount of time that the backlight is on controls the brightness of the display. By way of example, in FIG. 3 it is assumed that the backlight is on for 1 msec and off for 2 msec every cycle. The panel electronics may be active when an image is being generated on the display (image refresh) and then may be inactive for a certain period, vertical blanking interval (VBI), while the image is presented before a new image is generated. By way of example, in FIG. 3 it is assumed that the panel electronics are on for 3 msec and off for 6 msec every cycle.

As illustrated, there are three overlapping active periods 300, 320, 340 (illustrated as shaded regions) between the platform and the backlight and/or panel electronics. The first overlapping period 300 occurs during the first platform active period 305. The platform is active for the start of both a backlight active period 310 and an image refresh period 315. The first platform active period 305 lasts the entire backlight active period 310 and a portion of the image refresh active period 315. The second overlapping period 320 occurs during the second platform active period 325. The start of the platform active period 325 is aligned with the start of both a backlight active period 330 and a panel electronics active period 335. The second platform active period 325 lasts the entire backlight active period 330 and the entire image refresh active period 335. The third overlapping period 340 occurs during the fourth platform active period 345. The platform is active for the start of a backlight active period 350 and remains active through the entire backlight active period 350 and a portion of a next backlight active period 355. A panel electronics active period 360 is occurring when the fourth platform active period 345 begins and the fourth active period 345 remains active after the image refresh active period 360 ends.

As the display active periods (backlight, panel electronics) are not timing critical it may be possible to adjust the timing of the display active periods to minimize (reduce and possibly avoid) the overlap with the performance critical platform active periods. If the adjustments to the display active periods are limited to adjustments not detected by the human eye (several msec) the adjustments will not adversely affect the display quality and the user will be unaware of any changes. By intelligently rescheduling the display device active periods $I^2R$ power loss may be reduced and battery life may be preserved.

Figure 4:
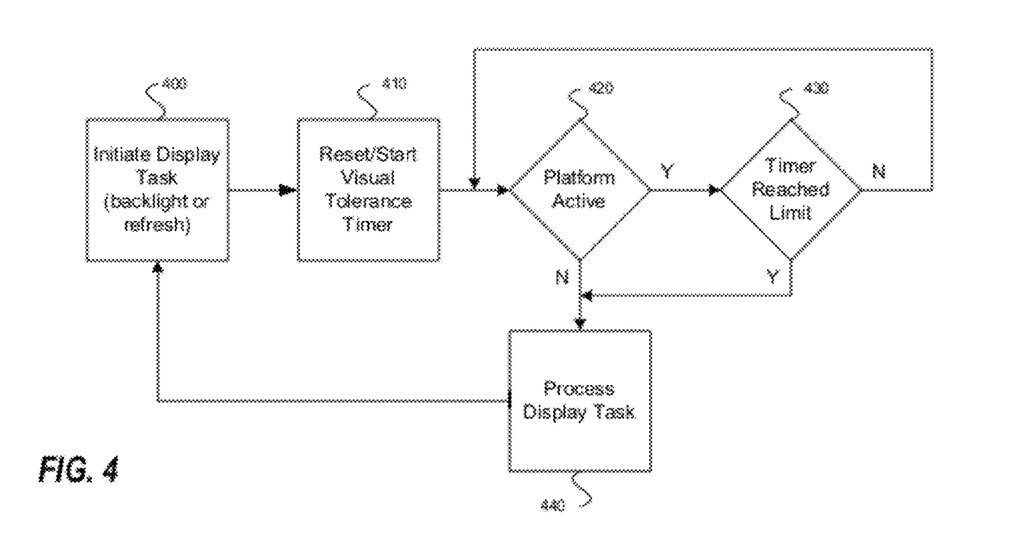
FIG. 4 illustrates an example flow chart of operations for rescheduling the display device active periods when the platform is active, according to one embodiment.

FIG. 4 illustrates an example flow chart of operations for rescheduling the non-timing critical display device active periods (backlight, image refresh) around the timing critical platform active periods. The operations delay the initiation of the non-timing critical display device active periods when the timing critical platform operations are active. Initially the display prepares for initiation of a display task 400. The display task may be turning on the backlight or may be processing an image refresh. Once the task is initiated a visual (non-timing critical) tolerance timer is reset and started 410.

The visual tolerance timer is the amount of time between when a display event is initiated (or scheduled) and when it is actually processed. A determination is then made as to whether the platform is active at that point 420. If the platform is not active (420 No), the display task is processed 440.

If the platform is determined to be active (420 Yes), a determination is made as to whether the timer has reached a visual tolerance limit 430. The visual tolerance limit is amount of time that a display event can be delayed without impacting the display quality and/or users visual experience. The visual tolerance limit may be the same for the backlight and the image refresh or may be different. The visual tolerance limit may vary based on the quality of what is being displayed. The visual tolerance limit may be programmable. If the timer has reached the limit (430 Yes), the display task is processed 440. If the timer has not yet reached the limit (430 No), the operations return to determining if the platform is active 420. This loop 420, 430 results in the processing of the display task being delayed while waiting for the processor to become inactive (420 No) or the limit to be reached (430 Yes). Once the display task has been processed 440 it will again wait for the initiation (scheduling) of the next display task 400.

The rescheduling of display device active periods is not limited to the operations or the order of operations described and illustrated in FIG. 4. Rather, the order of operations could be modified, various operations may be modified, additional operations may be added, operations may be removed, operations may be combined and/or operations may be separated without departing from the current scope. For example, the visual tolerance limit may be the amount of time between the completion of one display device active period and the start of the next display device active period and the timer may be reset and started at the conclusion of each active period.

Figure 5:
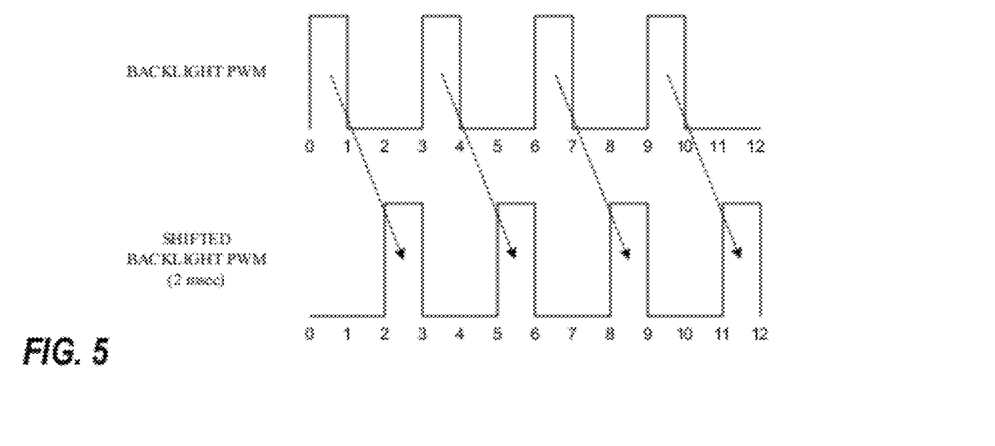
FIG. 5 illustrates an example timing diagram showing the rescheduling of display device active periods (delay in the overall display task cycle), according to one embodiment.

The rescheduling (delay) of a display device active period to avoid overlapping with a platform active period may delay the overall cycle for the display task (backlight, image refresh). FIG. 5 illustrates an example timing diagram showing the rescheduling of display device active periods (delay in the overall display task cycle). The timing diagram illustrated is for a backlight having a PWM where the backlight is on for 1 msec and then off for 2 msec. The top diagram illustrates the PWM of the backlight prior to any rescheduling. The diagram starts at time zero and the backlight is on for the first (from 0 to 1), fourth, seventh and tenth msec. The bottom diagram assumes that prior to initiation of the first backlight active period it was determined that the platform was active. In order to limit (and possibly avoid) an overlap with the platform active period the initiation of the first backlight active period as well as the overall backlight cycle and all the active periods may be delayed by 2 msec. Accordingly, the backlight is active during the third, sixth, ninth and twelfth msec.

Alternatively, the rescheduling (delay) of a display device active period (or several display device active periods) to avoid overlapping with a platform active period may not impact the overall display task cycle. If the overall backlight on-time ratio is maintained with the rescheduling, the device user may not notice any brightness change as the human eye is not sensitive enough to detect msec periods of brightness.

Figure 6:
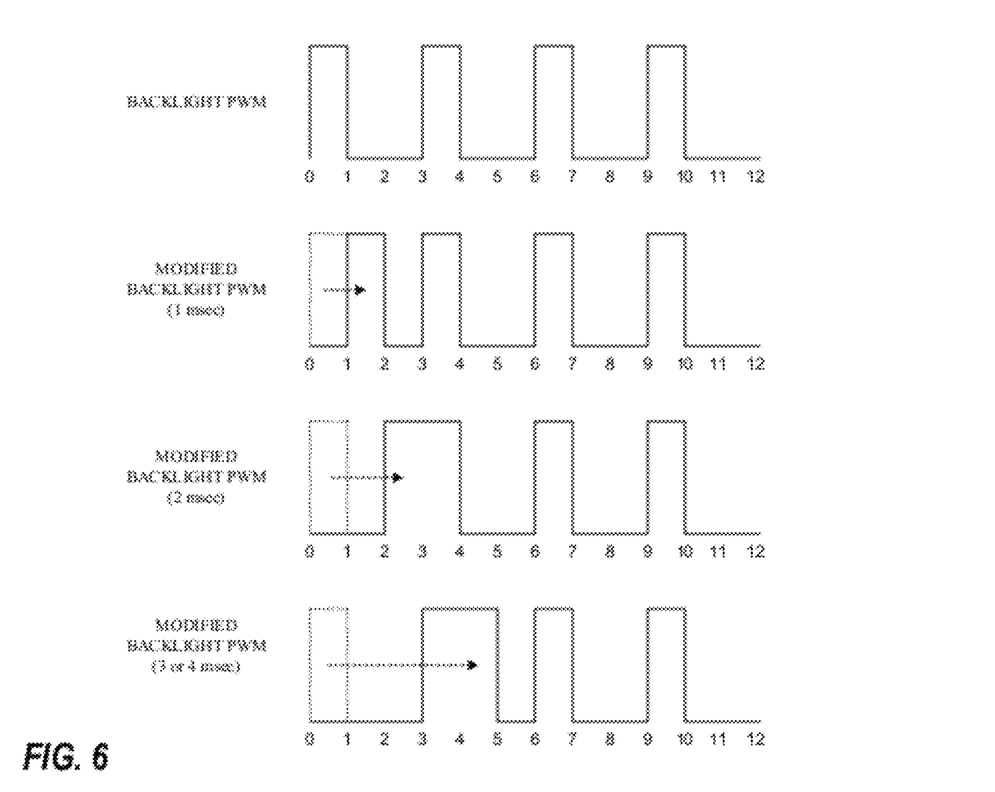
FIG. 6 illustrates example timing diagrams showing the rescheduling of a display device active period (no impact on overall display task cycle), according to one embodiment.

FIG. 6 illustrates example timing diagrams showing the rescheduling of a display device active period (no impact on overall display task cycle). The timing diagram illustrated is for a backlight having a PWM where the backlight is on for 1 msec and then off for 2 msec. The top diagram illustrates the PWM of the backlight prior to any rescheduling. The second diagram shows a delay of 1 msec in the first active period so the first active period occurs during the second msec and all other active periods remain the same.

The third diagram shows a delay of 2 msec in the first active period so the first active period occurs during the third msec and is combined with the original second active period that occurs during the fourth msec so that the backlight is active during the third and fourth msec. The bottom diagram shows a delay of 3 msec in the first active period so the first active period would occur during the fourth msec which is when an active period is already scheduled for. Accordingly, the first active period may occur during the fourth msec and the originally scheduled second active period may be delayed 1 msec and occur during the fifth msec. Alternatively, the first active period may be delayed an additional 1 msec and occur during the fifth msec. In either event, the backlight may be active during the fourth and fifth msec.

Figure 7:
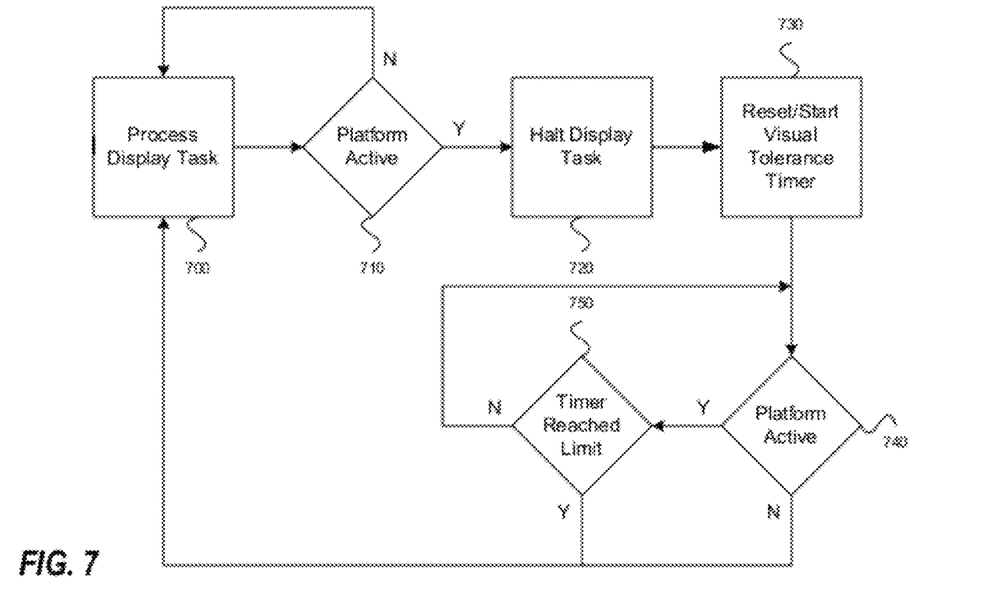
FIG. 7 illustrates an example flow chart of operations for halting the display device active periods when a platform active period is detected, according to one embodiment.

FIG. 7 illustrates an example flow chart of operations for rescheduling the non-timing critical display device active periods (backlight, image refresh) around the timing critical platform active periods. The operations halt the non-timing critical display device active periods when the timing critical platform operations become active. Initially the display begins processing a display task 700 (backlight, image refresh). While the display task is being processed (during the display device active period), a determination is made as to whether the platform is active 710. If the platform is not active (710 No), the display task continues to be processed 700. If the platform is determined to be active (710 Yes), the processing of the display task is halted 720 and a visual tolerance timer is reset and started 730. A determination is then made as to whether the platform is active 740. If the platform is not active (740 No), the processing of the display task is restarted 700. It should be noted that the display task may be restarted from the beginning (e.g., begin the image refresh again) or it may begin where it left off (e.g., image refresh continues from where it left off, may require register to record position left off).

If the platform is determined to be active (740 Yes), a determination is made as to whether the timer has reached a visual tolerance limit 750. If the timer has reached the limit (750 Yes), the processing of the display task is restarted 700. If the timer has not yet reached the limit (750 No), the operations return to determining if the platform is active 740. This loop 740, 750 results in the processing of the display task being delayed while waiting for the processor to become inactive (740 No) or the limit to be reached (750 Yes).

The halting of the display tasks is not limited to the operations or the order of operations described and illustrated in FIG. 7. Rather, the order of operations could be modified, various operations may be modified, additional operations may be added, operations may be removed, operations may be combined and/or operations may be separated without departing from the current scope.

Figure 8:
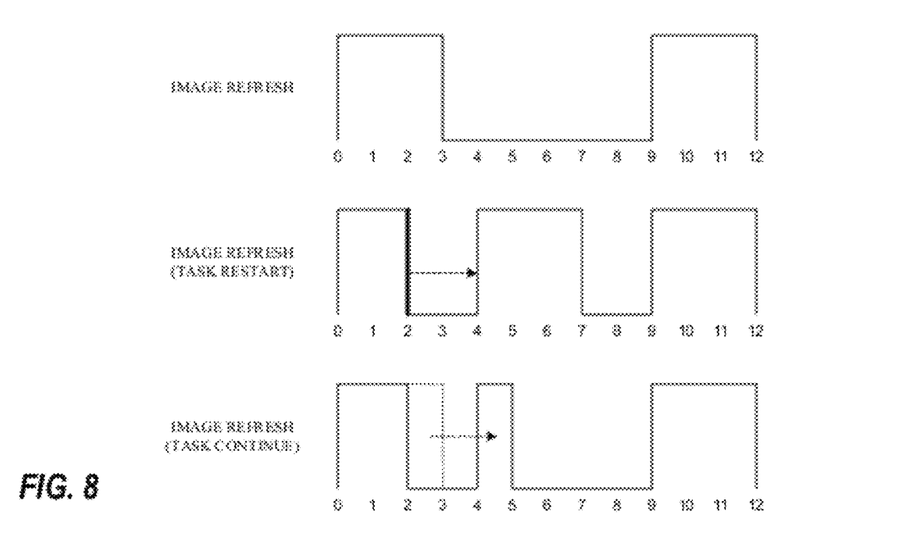
FIG. 8 illustrates example timing diagrams showing the halting of a display device active period, according to one embodiment.

FIG. 8 illustrates example timing diagrams showing the halting of a display device active period. The timing diagram illustrated is for an image refresh where the display is active for 3 msec while the image is generated and then is off for 6 msec before the next image is generated. The top diagram illustrates the image refresh cycle prior to any rescheduling. The diagram starts at time zero and the image refresh is active for the first through third (from 0 to 3) and ninth through twelfth msec. The bottom two diagrams assume that during the active refresh a platform active is detected and interrupts the image refresh active for 2 msec (either that is the duration of the platform active or that is the visual tolerance limit).

In the second diagram the active image refresh process is halted after 2 msec, and then after a 2 msec delay the whole active image refresh is processed over the fifth through seventh msec. In the third diagram the active image refresh process is halted after 2 msec, and then after a 2 msec delay the image refresh process continues where it left off during the fifth msec. It should be noted that as illustrated the overall image refresh cycle was not effected, that the second image refresh active portion still occurs between the tenth and twelfth msec. This was done for ease of illustration and in no way is intended to limit the scope thereto. Rather, the overall display task (image refresh) cycle could be delayed each time there is a need to reschedule a display task to avoid an overlap with platform active periods or certain times that may be determined based on various parameters (the parameters may be programmable).

Figure 9:
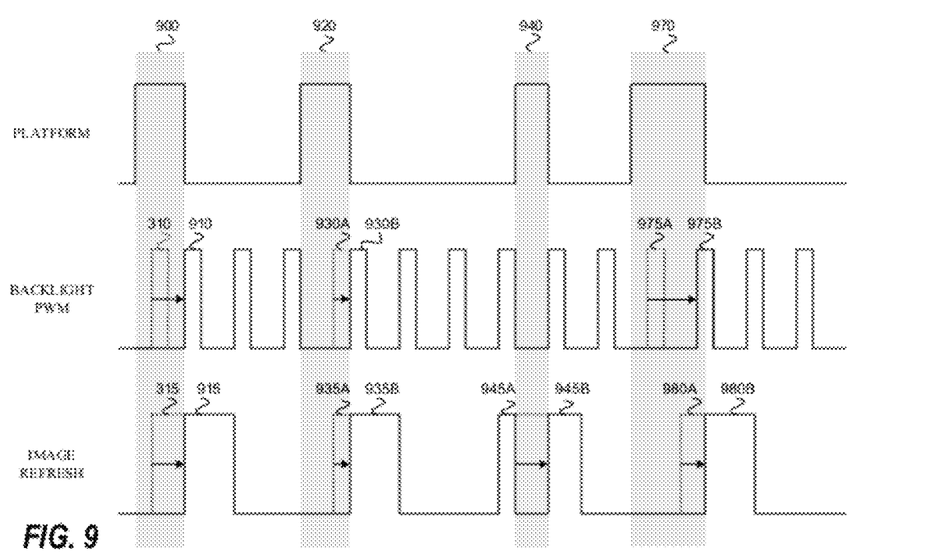
FIG. 9 illustrates an example timing diagram showing rescheduling of backlight active and image refresh active periods to minimize conflicts with the platform active periods, according to one embodiment.

FIG. 9 illustrates an example timing diagram showing rescheduling of display device (backlight and image refresh) active periods to minimize conflicts with the platform active periods. As illustrated, when a display device active period is delayed it delays the entire display task cycle from that point (as illustrated in FIG. 5). As the display device active periods are being shifted each platform active period is highlighted 900, 920, 940, 960 to determine if shifting caused any new overlaps. As illustrated when a display device active period is halted, it continues from the point it left off at when processing is resumed (as illustrated in bottom diagram of FIG. 8).

As illustrated, the backlight active period 310 and the entire backlight cycle from that point forward have been shifted (delayed) 2 msec. The shifted backlight active period 910 does not occur during the first platform active period 900. Backlight active period 930A (which is delayed 2 msec from backlight active period 330 of FIG. 3) and the entire backlight cycle from that point forward have been delayed 1 msec so the shifted backlight active period 930B does not occur during the second platform active period 920. Backlight active period 975A (which is aligned with backlight active period 350 of FIG. 3 because there was a total delay of a 3 msec cycle) and the entire backlight cycle from that point forward have been delayed 3 msec (assuming 3 msec is the maximum visual tolerance limit) so the shifted backlight active period 975B only slightly overlaps with the fourth platform active period 970.

As illustrated, the image refresh active period 315 and the entire image refresh cycle from that point forward have been shifted (delayed) 2 msec. The shifted image refresh active period 915 does not occur during the first platform active period 900. Image refresh active period 935A (which is delayed 2 msec from image refresh active period 335 of FIG. 3) and the entire image refresh cycle from that point forward have been delayed 1 msec so the shifted image refresh active period 935B does not occur during the second platform active period 920. Image refresh active period 945A (which is delayed 3 msec from the third image refresh active period, which was not numbered, of FIG. 3) is occurring when the third platform active period 940 begins. The image refresh active period 945A is halted for 2 msec so as not to overlap the third platform active period 940. When processing is restarted the processing of the image refresh continues from where it left off (last 2 msec) 945B. The result is that the entire image refresh cycle from that point forward has been delayed 2 msec. Image refresh active period 980A (which is delayed 5 msec from the image refresh active period 360 of FIG. 3) and the entire image refresh cycle from that point forward have been delayed 1.5 msec so the shifted image refresh active period 980B does not overlap with the fourth platform active period 970.

Figure 10:
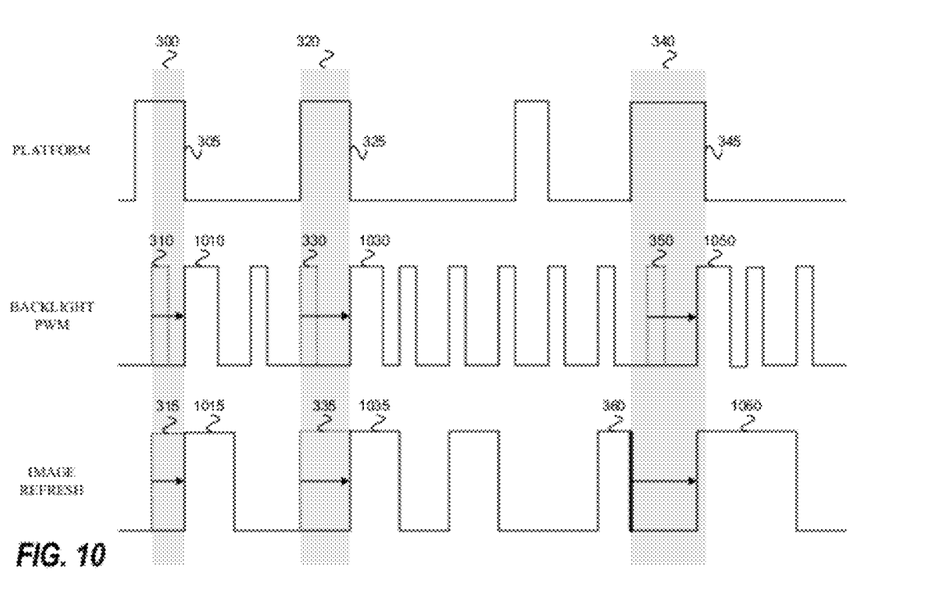
FIG. 10 illustrates an example timing diagram showing rescheduling of backlight active and image refresh active periods to minimize conflicts with the platform active periods, according to one embodiment.

FIG. 10 illustrates an example timing diagram showing rescheduling of display device (backlight and image refresh)

active periods to minimize conflicts with the platform active periods. As illustrated, when a display device active period is delayed it delays only that active period and not the entire display task cycle (as illustrated in FIG. 6). As illustrated when a display device active period is halted, it starts over when processing is resumed (as illustrated in middle diagram of FIG. 8). The platform active periods, the non-modified display event active periods, and the overlapping active periods are the same as those illustrated in FIG. 3 and are accordingly numbered the same.

As illustrated, the backlight active period 310 has been shifted (delayed) 2 msec to avoid the first overlapping active period 300. The shifting 2 msec means that two backlight active periods will abut to produce one 2 msec backlight active period 1010. The backlight active period 330 has been delayed 3 msec (or possibly 4 msec if delayed until after current backlight display period) to avoid the second overlapping active period 320. The shifting 3 msec means that two backlight active periods will abut to produce one 2 msec backlight active period 1030. The backlight active period 350 have been delayed 3 msec (assuming 3 msec is the maximum visual tolerance limit) to limit the overlap with the platform active period 345 (minimize the third overlapping active period 340). The shifting 3 msec means that two backlight active periods will abut to produce one 2 msec active period 1050.

As illustrated, the image refresh active period 315 has been shifted (delayed) 2 msec to avoid the first overlapping active period 300. The image refresh active period 335 has been delayed 3 msec to avoid the second overlapping active period 320. The image refresh active period 360 is occurring when the platform active period 345 begins. The image refresh active period 360 is halted for 4 msec (assuming 4 msec is the maximum visual tolerance limit) to limit the overlap with the platform active period 345 (minimize the third overlapping active period 340). When processing is restarted the processing of the image refresh starts at the beginning (active for all 3 msec even though 2 msec were processed prior to halting) 1060. The result of the delay of 4 msec and the reprocessing of 2 msec is that two image refresh active periods will abut to produce one 6 msec image refresh active period 1060.

Referring back to FIG. 2, the rescheduling operations described in the flow charts of FIGS. 4 and 7 may be implemented in one or more of the devices of the platform 210 (CPU 215, graphics 220, memory 225, I/O 230), a discrete component on the platform 210, one or more devices of the display 240 (panel electronics 245, backlight diver), a discrete component on the display 240, or some combination thereof. Furthermore, the operations may be implemented in hardware, software, firmware or some combination thereof. The various devices (CPU 215, graphics 220, memory 225, I/O 230, panel electronics 245, backlight diver) may have access to device (e.g., processor) readable storage (on the device, off the device, or some combination thereof) that contains instructions that when executed by the device causes the device to perform at least a subset of the operations described above in FIGS. 4 and 7.

The devices may include registers that track whether the device is active or inactive. The status maintained in each register may be provided to and/or accessible by each of the other devices. Accordingly, the various devices may know the active status of the other devices and may take necessary actions to minimize the overlapping of platform (timing critical) and display (visual experience critical) active periods.

For example, the CPU 215 may determine that the backlight driver is active at the same time as the CPU 215 (and/or one or more of the other devices of the platform 210) and may instruct the backlight driver to halt the active period. The CPU 215 may instruct the backlight driver upon completion of the platform active period so that the backlight driver can continue operations. The CPU 215 may maintain the timer and determine when the visual tolerance limit has been met and instruct the backlight driver. Alternatively, the backlight driver may maintain the timer and determine when the visual tolerance limit has been met and restart operations at that point even though the CPU has not indicated the platform active period is complete.

By way of another example, the panel electronics 245 may determine that one or more of the devices on the platform 210 is active at the same time it is active and may halt the image refresh active period and start the timer. The panel electronics 245 may restart the image refresh either after the platform active period is concluded or after visual tolerance limit has been met. The panel electronics may write where the image refresh was when it was halted so that upon re-initiation it may continue from the same place.

The various embodiments described above where described with respect to being incorporated within a mobile device where reducing power loss and thus increasing amount of usable energy from the battery is vital. However, the various embodiments are not limited to mobile devices. Rather, they could be implemented in any electronic device having a display as the implementation would reduce power loss and thus overall power consumed (conserve energy). For example, the various embodiments may incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. A method performed in a mobile device having a processing platform and a display, wherein the processing platform includes at least some subset of a central processing unit (CPU), a graphics processing unit (GPU), memory, and input/output, the method comprising determining when the processing platform is performing a timing critical task associated with processing data for presentation of a video to the display at same time as the display is performing a non-timing critical task associated with presenting images from the video on the display including at least some subset of image refresh and backlight modulation; and when the timing critical task is being performed at the same time as the non-timing critical task, rescheduling the performing of the non-timing critical task around the performing of the timing critical task to minimize overlap between the timing critical task and the non-timing critical task, wherein the rescheduling does not impact performance of the mobile device or a user's visual experience and reduces power consumption and power loss of the mobile device, and wherein the rescheduling includes:
  establishing a visual tolerance threshold for the non-timing critical task, wherein the visual tolerance threshold is a time by which the performing of the non-timing critical task needs to occur to avoid impacting the user's visual experience;
  determining when the visual tolerance threshold has been reached, wherein a timer is used to track the time associated with the visual tolerance threshold;
  determining when the timing critical task is complete;
  eliminating the overlap by delaying the performing of the non-timing critical task until completion of the timing critical task when the timing critical task is completed prior to the visual tolerance threshold being reached, and
  reducing the overlap by delaying the performing of the non-timing critical task until the visual tolerance threshold has been reached when the visual tolerance threshold is reached prior to completion of the timing critical task.

2. The method of claim 1, wherein
the establishing the visual tolerance threshold includes establishing the visual tolerance threshold as amount of time between completion of a first non-timing critical task and start of a second non-timing critical task, and
the determining when the visual tolerance threshold has been reached includes refreshing and starting the timer when the first non-timing critical task is completed.

3. The method of claim 1, wherein
the establishing the visual tolerance threshold includes establishing the visual tolerance threshold as amount of time between initiation of a non-timing critical task and start of the non-timing critical task, and
the determining when the visual tolerance threshold has been reached includes refreshing and starting the timer when the non-timing critical task is initiated.

4. The method of claim 1, wherein
the establishing the visual tolerance threshold includes establishing the visual tolerance threshold as amount of time the non-timing critical task can be delayed, and
the determining when the visual tolerance threshold has been reached includes refreshing and starting the timer when the non-timing critical task is rescheduled.

5. The method of claim 1, wherein the rescheduling includes delaying start of the non-timing critical task when the timing critical task is active when the non-timing critical task is initiated.

6. The method of claim 1, wherein the rescheduling includes halting the non-timing critical task when the timing critical task becomes active during active operation of the non-timing critical task.

7. The method of claim 6, wherein the rescheduling includes resuming the non-timing critical task from where it was halted.

8. The method of claim 6, wherein the rescheduling includes resuming the non-timing critical task from its beginning.

9. The method of claim 1, wherein the rescheduler is to reschedule the image refresh of the display when the image refresh of the display overlaps with the timing critical task.

10. The method of claim 1, wherein the rescheduler is to reschedule the backlight modulation when the backlight modulation overlaps with the timing critical task.

11. A mobile computing device comprising
one or more processors to perform timing critical tasks associated with processing data related to presentation of a video, wherein the one or more processors include at least some subset of a central processing unit (CPU) and a graphics processing unit (GPU);
a display to present the visual information to a user;
one or more circuits to control operation of the display including generation of images on the display and illumination of the images, wherein tasks performed by the one or more circuits are non-timing critical such that a delay up to a visual tolerance threshold will not impact a user's visual experience; and
a rescheduler to
  determine when the one or more processors is performing a timing critical task associated with the processing data for presentation of the video to the one or more circuits at same time as the one or more circuits is performing a non-timing critical task associated with presenting images from the video on the display; and
  when the timing critical task is being performed at the same time as the non-timing critical task, reschedule the non-timing critical task around the timing critical task to minimize overlap between the timing critical task and the non-timing critical task, wherein the rescheduling does not impact of the performance of the mobile device or a user's visual experience and reduces power consumption and power loss of the mobile device, and wherein the rescheduling includes:
    establishing the visual tolerance threshold for the non-timing critical task, wherein the visual tolerance threshold is a time by which the performing of the non-timing critical task needs to occur to avoid impacting the user's visual experience;
    determining when the visual tolerance threshold has been reached, wherein a timer is used to track the time associated with the visual tolerance threshold;
    determining when the timing critical task is complete;
    eliminating the overlap by delaying the performing of the non-timing critical task until completion of the timing critical task when the timing critical task is completed prior to the visual tolerance threshold being reached, and
    reducing the overlap by delaying the performing of the non-timing critical task until the visual tolerance threshold has been reached when the visual tolerance threshold is reached prior to completion of the timing critical task.

12. The mobile computing device of claim 11, wherein the rescheduler is to delay start of the non-timing critical task when the timing critical task is active when the non-timing critical task is initiated.

13. The mobile computing device of claim 11, wherein the rescheduler is to temporarily halt the non-timing critical task when the timing critical task has become active during active operation of the non-timing critical task.

14. The mobile computing device of claim 11, wherein the rescheduler is implemented in the one or more processors.

15. The mobile computing device of claim 11, wherein the rescheduler is implemented in the one or more circuits.

16. The mobile computing device of claim 11, wherein the rescheduler is implemented in a discrete component.

17. The mobile computing device of claim 11, wherein the rescheduler is to reschedule the image refresh of the display when the image refresh of the display overlaps with the timing critical task.

18. The mobile computing device of claim 11, wherein the rescheduler is to reschedule the backlight modulation when the backlight modulation overlaps with the timing critical task.

19. A mobile device display comprising
  panel electronics to generate images on an optical stack of the display based on input from a processing platform of the mobile device, wherein tasks performed by the processing platform to prepare the input are timing critical and tasks performed by the panel electronics are non-timing critical;
  a backlight driver to control operation of a backlight used to illuminate the optical stack so that the user can see the images generated on the display, wherein tasks performed by the backlight driver are non-timing critical; and
  a rescheduler to
    determine when the processing platform is performing a timing critical task at same time as at least one of the panel electronics and the backlight driver are performing a non-timing critical task; and
    when the timing critical task is being performed at the same time as the non-timing critical task, reschedule the non-timing critical task around the timing critical task to minimize overlap between the timing critical task and the non-timing critical task, wherein the rescheduling does not impact performance of the mobile device or a user's visual experience and reduces power consumption and power loss of the mobile device, and wherein the rescheduling includes:
      establishing a visual tolerance threshold for the non-timing critical task, wherein the visual tolerance threshold is a time by which the performing of the non-timing critical task needs to occur to avoid impacting the user's visual experience;
      determining when the visual tolerance threshold has been reached, wherein a timer is used to track the time associated with the visual tolerance threshold;
      determining when the timing critical task is complete;
      eliminating the overlap by delaying the performing of the non-timing critical task until completion of the timing critical task when the timing critical task is completed prior to the visual tolerance threshold being reached, and
      reducing the overlap by delaying the performing of the non-timing critical task until the visual tolerance threshold has been reached when the visual tolerance threshold is reached prior to completion of the timing critical task.

20. The mobile device display of claim 19, wherein the rescheduler is implemented in the panel electronics and the backlight driver.

21. The mobile computing device of claim 19, wherein the rescheduler is a discrete component.

* * * * *